United States Patent [19]
Wycech

[11] Patent Number: 5,888,600
[45] Date of Patent: *Mar. 30, 1999

[54] REINFORCED CHANNEL-SHAPED STRUCTURAL MEMBER

[75] Inventor: Joseph S. Wycech, Grosse Pointe Woods, Mich.

[73] Assignee: Henkel Corporation, Gulph Mills, Pa.

[ * ] Notice: The term of this patent shall not extend beyond the expiration date of Pat. No. 5,575,526.

[21] Appl. No.: 675,173

[22] Filed: Jul. 3, 1996

[51] Int. Cl.⁶ ...................................... B29D 22/00
[52] U.S. Cl. .................... 428/35.9; 428/36.5; 428/358; 428/613
[58] Field of Search ................ 428/35.9, 36.5, 428/358, 613

[56] References Cited

U.S. PATENT DOCUMENTS

| | | | |
|---|---|---|---|
| 3,665,968 | 5/1972 | De Putter | 138/141 |
| 4,082,825 | 4/1978 | Puterbaugh | 264/46.5 |
| 4,751,249 | 6/1988 | Wycech | 521/54 |
| 4,762,352 | 8/1988 | Enomoto | 293/120 |
| 4,901,500 | 2/1990 | Wycech | 52/793 |
| 4,908,930 | 3/1990 | Wycech | 29/527.2 |
| 4,923,902 | 5/1990 | Wycech | 521/54 |
| 4,978,562 | 12/1990 | Wycech | 428/35.8 |
| 5,124,186 | 6/1992 | Wycech | 428/35.8 |
| 5,213,391 | 5/1993 | Takagi | 296/205 |
| 5,575,526 | 11/1996 | Wycech | 428/36.5 |

*Primary Examiner*—Randy Gulakowski
*Attorney, Agent, or Firm*—Ernest G. Szoke; Wayne C. Jaeschke; Martin G. Meder

[57] ABSTRACT

A reinforced structural member has a channel-shaped laminate structure of a metal stamping, a channel-shaped foil and an intervening layer of structural foam. The reinforced structural member is formed by pressing a foil/resin preform into a channel and thermally expanding the resin to form a structural foam.

12 Claims, 2 Drawing Sheets

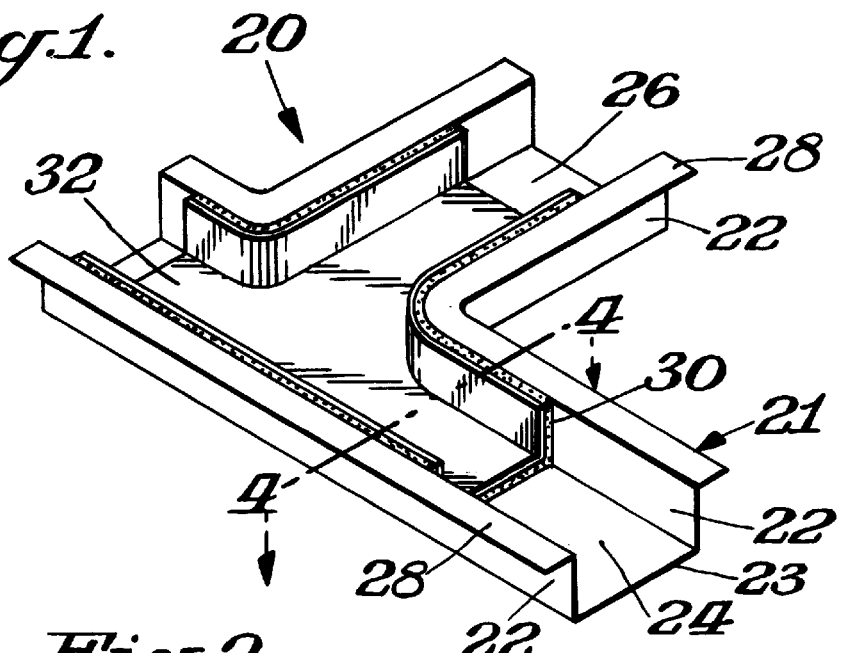
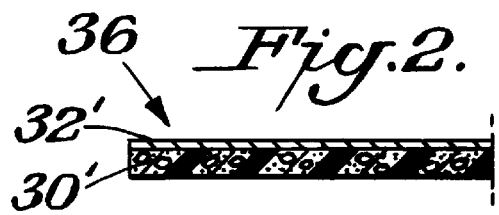
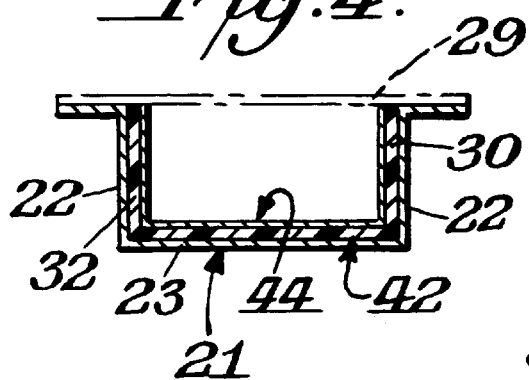
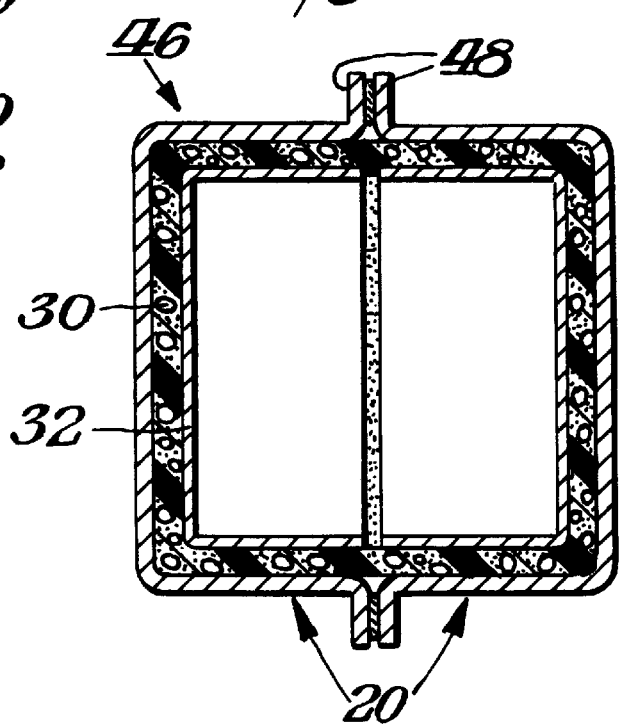

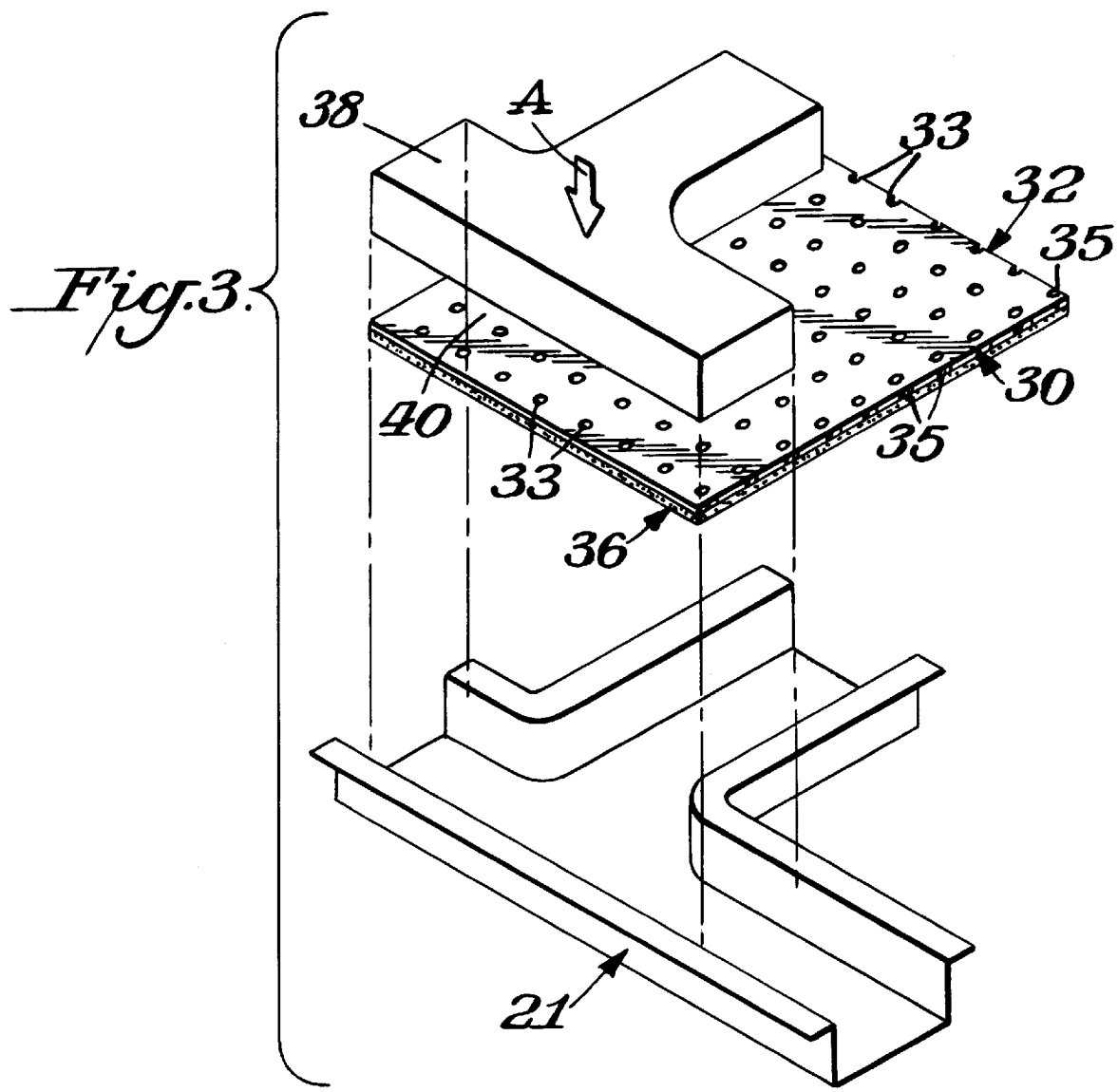

REINFORCED CHANNEL-SHAPED STRUCTURAL MEMBER

TECHNICAL FIELD

The present invention relates generally to methods and apparatus for reinforcing various structures and, more specifically, relates to reinforced channel-shaped members.

BACKGROUND OF THE INVENTION

In a number of applications, light-weight, high-strength structural members are required, for example in motor vehicles and aircraft as well as in various devices such as home appliances and the like. A number of composite materials have been proposed in the past as structural members, such as exotic light-weight alloys. In most applications, however, mass reduction must be balanced against the cost of the product to the consumer. Thus, there is a need for providing strength without significantly increasing materials and labor costs. Moreover, reinforcement techniques are needed which can be adapted to existing geometries of structural parts, obviating any requirement for fundamental design changes.

As examples of reinforcement techniques, the present inventor has disclosed a number of metal/plastic composite structures for use in reinforcing motor vehicles components. In U.S. Pat. No. 4,901,500, entitled "Lightweight Composite Beam," a reinforcing beam for a vehicle door is disclosed which comprises an open channel-shaped metal member having a longitudinal cavity which is filled with a thermoset or thermoplastic resin-based material. In U.S. Pat. No. 4,908,930, entitled, "Method of Making a Torsion Bar," a hollow torsion bar reinforced by a mixture of resin with filler is described. The tube is cut to length and charged with a resin-based material.

In U.S. Pat. No. 4,751,249, entitled, "Reinforcement Insert for a Structural Member with Method of Making and Using the Same," a precast reinforcement insert for structural members is provided which is formed of a plurality of pellets containing a thermoset resin with a blowing agent. The precast member is expanded and cured in place in the structural member. In U.S. Pat. No. 4,978, 562, entitled, "Composite Tubular Door Beam Reinforced with a Syntactic Foam Core Localized at the Mid Span of the Tube," a composite door beam is described which has a resin-based core that occupies not more than one-third of the bore of a metal tube.

In co-pending U.S. patent application Ser. No. 08/245,798, filed May 19, 1994, entitled "Composite Laminate Beam for Automotive Body Construction," a hollow laminate beam characterized by high stiffness-to-mass ratio and having an outer portion which is separated from an inner tube by a thin layer of structural foam is described. In co-pending U.S. patent application Ser. No. 08/245,798, filed May 19, 1994 now U.S. Pat. No. 5,575,526, entitled "Composite Laminate Beam for Automotive Body Construction," a W-shaped carrier insert reinforcement which carries a foam body is described for use in reinforcing a hollow beam.

In copending U.S. patent application Ser. No. 08/644,389, filed May 10, 1996, entitled "INTERNAL REINFORCEMENT FOR HOLLOW STRUCTURAL ELEMENTS," the present inventor discloses an I-beam reinforcement member which includes an external foam layer. The I-beam, as in the case of most of the foregoing reinforcements, involves a preformed structural insert which is then inserted into a hollow structural member.

It is also known to increase strength of a laminate structure by bonding together flat metal plates using an intervening layer of resin. For example, it is known to form a metal laminate sheet for use as a floor panel member which comprises a pair of flat metal sheets having an intervening layer of asphalt or elastic polymer.

Although filling the entirety of a section with plastic foam does significantly increase section stiffness (at least when high-density foams are utilized), this technique also may significantly increase mass and thus part weight, which, as stated, is an undesirable feature in most applications. In addition, filling a section entirely with foam may be prohibitively expensive and creates a large heat sink. And, although increasing the metal gauge of a section or adding localized metal reinforcements will increase stiffness, as the metal thickness increases, it is more difficult to form the part due to limitations of metal forming machines.

Accordingly, it would be desirable to provide a low-cost technique for reinforcing a channel-shaped structural member without proportionately increasing the mass. It would also be desirable to provide a method of reinforcing an existing channel-shaped member which does not require any fundamental design changes to the member. The present invention provides channel-shaped members which have increased strength with moderate increases in mass and without the use of high volumes of expensive resins. The present invention further provides a method for reinforcing existing structural parts without redesigning the geometry of the part. It has been found that the present invention increases section stiffness and provides vibration dampening in channel-shaped sections in a highly efficient and reproducible manner.

SUMMARY OF THE INVENTION

In one aspect the present invention provides a reinforced channel-shaped member. The channel-shaped member is preferably a stamping or the like which defines a channel. The channel generally has a length which is greater than its width. The channel-shaped member is typically formed of metal or plastic. A layer of expanded structural foam is disposed in the channel. The shape of the structural foam matches that of the channel-shaped stamping; that is, the foam has one surface which is bonded to and conforms to the wall of the channel-shaped member defining the channel and another (opposed) surface which is itself channel-shaped. An insert is disposed and bonded to the layer of structural foam. The insert geometry mates with that of the structural foam. The insert is a metal foil or plastic and has a thickness of from 0.002 to 0.100 inch.

In another aspect two reinforced channel shaped members are formed and are then joined together to form a reinforced tube.

In still another aspect the present invention provides a method of reinforcing a structural part which includes the steps of forming a laminated structure having a layer of unexpanded, uncured foam-forming resin and a layer comprising a metal or plastic carrier sheet; placing the laminate on a part having a non-planar geometry; conforming the laminate to the geometry of the non-planar part; and thermally expanding and bonding the resin to the part.

In one aspect the method of the present invention reinforces a channel-shaped structure through the steps of extruding a planar layer of thermally-expandable structural resin onto the surface of a release liner; placing a planar foil on the resin to form a foil/resin laminate having a release layer; die cutting the material to shape; removing the release liner; placing the foil/resin laminate over a channel-shaped structural member such that the resin layer is facing the part; pressing the foil/resin laminate structure into the channel such that the resin layer contacts the part in the channel; trimming away any excess foil/resin laminate from the part; and heating the part to thermally expand the thermally expandable resin and to securely bond the resin to the foil and to the channel-shaped member.

These and other advantages and objects of the present invention will now be more fully described with reference to the drawings.

BRIEF DESCRIPTION OF THE DRAWINGS

FIG. 1 is a perspective view of a reinforced channel member made in accordance with the present invention.

FIG. 2 is a cross section of a two layer foil/resin laminate used in the present invention.

FIG. 3 is an exploded view of the reinforced channel member of FIG. 1 in an intermediate stage of construction with the forming tool shown in position above the preform.

FIG. 4 is a cross section along lines 4—4 of FIG. 1.

FIG. 5 is a cross section of two reinforced channel shaped structures made in accordance with the present invention welded to together at their flanges to form a reinforced tube.

DETAILED DESCRIPTION OF THE PREFERRED EMBODIMENTS OF THE INVENTION

Referring now to FIG. 1 of the drawings, reinforced structural part 20 is shown generally having stamping 21 with walls 22 and floor or bottom 23 which define channels 24 and 26. Flanges 28 are also seen which may receive a closure plate 29 shown in phantom in FIG. 4. Stamping 21 is preferably a metal stamping but could be formed by another metal forming technique such as casting or the like or could be formed of a material such as plastic, for example polycarbonate. The dimensions of stamping 21 may vary widely depending on the application. In the most preferred embodiment of the present invention, stamping 21 is a structural member, for example a radiator support structure, in a motor vehicle. Stamping 21 has a metal gauge or thickness of from about 0.030 to about 0.120 inch.

Still referring to FIG. 1 of the drawings, thermally expanded structural foam layer 30 is shown disposed on walls 22 and floor or bottom 23 in channels 24 and 26. Thermally expanded structural foam layer 30 is a structural foam that adds stiffness, strength, and vibration dampening characteristics to reinforced structural part 20. Thermally expanded structural foam layer 30 is expanded through the use of heat, as will be more fully described hereinafter and, in the expanded state depicted in FIG. 1, has a thickness of from about ⅛ inch to about ⅜ inch and more preferably has a thickness of from about 3/16 inch to about ¼ inch.

Inner reinforcement or foil 32 is seen disposed on thermally expanded structural foam layer 30 and comprises, in the most preferred embodiment, a steel foil, an aluminum foil or glass impregnated resin (Fiberglass), although it may be possible to utilize other materials in some applications. Inner reinforcement or foil 32 defines its own channel, as will be described more fully herein.

In the preferred embodiment, inner reinforcement or foil 32 is provided with a plurality of perforations 33 (shown only in FIG. 3) that define perforation channels 35 (shown in FIGS. 3 and 4). Perforations 33 serve the important function of allowing gas to escape through inner reinforcement or foil 32 as layer 30 thermally expands when heated. In the absence of perforations 33, thermally expanded structural foam layer 30 may not bond properly to stamping 21 due to the formation of gas pockets.

Thermally expanded structural foam layer 30 preferably has a thickness of from about ⅛ inch to about ½ inch and more preferably, in automotive applications, a thickness of from about ¼ inch to ⅜ inch. In most applications, thermally expanded structural foam layer 30 will extend over the entire area of foil 32; that is, it will completely separate foil 32 from stamping 21.

One important aspect of the present invention is mass reduction in reinforced structural part 20. Also, as described in the forgoing background, resin is a relatively expensive component and thus resin reduction is a desirable goal. By providing conforming or nested formed-in-place channel-shaped structures as shown in FIG. 1, resin volume is reduced over a solid fill of resin and weight is reduced by using a reinforcing foil rather than a thick heavy metal insert.

Referring now to FIG. 2 of the drawings, in accordance with the method of the present invention, laminate preform 36 is shown having thermally expandable structural resin layer 30' and inner reinforcement or foil 32' in the form of a two-layer laminate construction. The preferred method of forming laminate preform 36 is by extruding thermally expanded structural foam layer 30' onto a release paper such as a wax paper. The resin/release paper sheet is then ready to receive foil 32', i.e. foil 32' is placed on the resin side of the resin/release paper sheet. The resulting "tri-laminate" is then run through a pinch roller or the like to securely bond the resin to the foil. The procedure of forming the tri-laminate is preferably carried out using a conveyor or the like. The resin/release layer/foil sheet is then die cut to shape; the release liner is removed just prior to use . In this preferred process, thermally expandable structural resin layer 30' is at a temperature of about 100° F. to 150° F. as it is deposited on the liner.

Most preferably, foil 32' is perforated with an average of about 1 to about 2 perorations per square inch with each perforation having a diameter of about 1/16 inch to about 3/16 inch. The perforations are preformed in foil 32' prior to lamination to the resin sheet. Using the most preferred formulation for thermally expandable structural resin layer 30', laminate preform 36 can be used up to about ninety days after it is fabricated. As stated above, laminate preform 36 (unexpanded) has a thickness of from about ⅛ inch to about ¼ inch.

Referring now to FIG. 3 of the drawings, the preferred method of conforming laminate preform 36 to stamping 21 is through the use of forming tool 38 which is shown positioned above laminate preform 36 moving in the direction of arrow A. That is, forming tool 38 contacts principal surface 40 of preform 36 and presses laminate preform 36 into channels 24 and 26. It will be appreciated then that, in essence, structural foam channel 42 and foil channel 44 are formed as best seen in FIG. 4. As also best seen in FIG. 4, thermally expanded structural foam layer 30 and inner reinforcement or foil 32 are trimmed to below the top surface of stamping 21.

In FIG. 5 of the drawings, two reinforced structural parts 20 are shown joined to form reinforced tube 46 with welded flanges 48. Thus, the present invention can also be used where tube applications are required.

A number of resin-based compositions can be utilized to form thermally expanded structural foam layer 30 in the present invention. The preferred compositions impart excellent strength and stiffness characteristics to reinforced structural part 20 while adding only marginally to the weight. With specific reference now to the composition of thermally expanded structural foam layer 30, the density of the material should preferably be from about 15 pounds per cubic feet to about 50 pounds per cubic feet to minimize weight. The melting point, heat distortion temperature and the temperature at which chemical breakdown occurs must also be sufficiently high such that thermally expanded structural foam layer 30 maintains it structure at high temperatures typically encountered in paint ovens and the like. Therefore, thermally expanded structural foam layer 30 should be able to withstand temperatures in excess of 140 degrees F. and preferably 350 degrees F. for short times without exhibiting substantial heat-induced distortion or degradation.

In more detail, in one particularly preferred embodiment thermally expanded structural foam layer 30 includes a synthetic resin, microspheres, a blowing agent and a filler. A synthetic resin comprises from about 40 percent to about 90 percent by weight, preferably from about 50 percent to about 80 percent by weight, and most preferably from about 50 percent to about 70 percent by weight of thermally expanded structural foam layer 30'. In the present invention, foam layer 30 has a cellular structure which provides a low-density, high-strength material, which, in reinforced structural part 20, provides a strong, yet lightweight structure. Microspheres which are compatible with the present invention include reinforcing "hollow" spheres or microbubbles which may be formed of either glass or plastic. Plastic microspheres may be either thermosetting or thermoplastic and either expanded or unexpanded. In one embodiment, unexpanded microspheres are used which are then expanded to form thermally expanded structural foam layer 30. The preferred microspheres are from about 10 to about 400 and preferably from about 20 to about 100 microns in diameter. The microspheres may also comprise a larger, lightweight material such as macrospheres of greater than 400 microns in diameter. Glass microspheres are particularly preferred. Also, a blowing agent is preferably included which may be either a chemical blowing agent or a physical blowing agent. The microsphere component constitutes from about 5 percent to about 50 percent by weight, preferably from about 10 percent to about 40 percent by weight, and most preferably from about 15 percent to about 40 percent by weight of the material which forms thermally expandable structural foam layer 30'. The blowing agent constitutes from about 1 percent to about 15 percent by weight, preferably from about 1 percent to about 10 percent by weight, and most preferably from about 1 percent to about 5 percent by weight of thermally expandable structural resin layer 30'. Suitable fillers include glass or plastic microspheres, silica fume, calcium carbonate, milled glass fiber, and chopped glass strand. Glass microspheres are particularly preferred. Other materials may be suitable. A filler comprises from about 1 percent to about 40 percent by weight, preferably from about 1 percent to about 30 percent by weight and most preferably from about 1 percent to about 20 percent by weight of thermally expandable structural resin layer 30'.

Preferred synthetic resins for use in the present invention include thermosets such as epoxy resins, vinyl ester resins, thermoset polyester resins, and urethane resins. It is not intended that the scope of the present invention be limited by molecular weight of the resin. Where the resin component of the liquid filler material is a thermoset resin, various accelerators, such as "EMI-24" (imidazole accelerator) and "DMP-30," and curing agents, preferably organic peroxides such as "MEK" peroxide and "Percadox," may also be included to enhance the cure rate. A functional amount of accelerator is typically from about 0.1 percent to about 4.0 percent of the resin weight with a corresponding reduction in one of the the other components. Effective amounts of processing aids, stabilizers, colorants, UV absorbers and the like may also be included in layer. Thermoplastics may also be suitable.

The following tables show preferred formulations for thermally expandable structural foam layer 30'. It has been found that these formulations provide a thermally expanded structural foam layer which fully expands and cures at about 320° F. and provides a reinforced structural part 20 having excellent structural properties. All percentages in the present disclosure are percent by weight unless otherwise specifically designated.

| INGREDIENT | BY WEIGHT |
|---|---|
| FORMULA I | |
| Polyester Resin ("ARS-137-69") | 80.9 |
| "Percadox 16N" | 1.1 |
| "3M C15" | 18 |
| FORMULA II | |
| EPON 828 | 54.5 |
| Haloxy 62 | 7.5 |
| Der 732 | 6.1 |
| Expancel 551DU | 2.0 |
| SG Micros | 8.8 |
| 3M K20 | 17.7 |
| DI-CY | 3.4 |
| FORMULA III | |
| Polyester Resin ("ARISTECH 13031") | 48.8 |
| "Percadox 16N" | 0.7 |
| "SG Micros" (PA IND) | 50.5 |

What is claimed is:

1. A reinforced structural member comprising a structural member having a non-planar wall, a reinforcing laminate lining secured to said non-planar wall and having the same shape as said non-planar wall, said lining comprising a foam layer bonded to said non-planar wall and a thin foil made of metal or polymer/plastic bonded to said foam layer, and said lining being of uniform thickness to provide an exposed surface of the same shape as said non-planar wall of said structural member.

2. The reinforced structural member recited in claim 1, wherein said structural member is a beam.

3. The reinforced structural member recited in claim 1, wherein said structural foam includes glass microspheres.

4. The reinforced structural member recited in claim 1, wherein said foil has a thickness of from about 0.002 to about 0.015 inch.

5. The reinforced structural member recited in claim 1, wherein said foam layer has a thickness of from about ⅛ inch to about ½ inch.

6. The reinforced structural member recited in claim 1, wherein said structural member is a metal stamping.

7. The reinforced structural member recited in claim 1, wherein two of said structural members are joined together in the shape of a tube.

8. The reinforced structural member recited in claim 1, wherein said non-planar wall forms a channel.

9. The reinforced structural member recited in claim 8 wherein said structural member is T-shaped with a pair of said channels intersecting each other.

10. The reinforced structural member recited in claim 8 including a closure plate on top of and enclosing said channel.

11. The reinforced structural member recited in claim 1 wherein said foam is made from an expandable resin, and said foil having a plurality of perforations extending completely through said foil to provide passageways for the escape of gas from said resin when said resin is expanded.

12. The reinforced structural member recited in claims 11 wherein said foil is made of metal having a thickness in the range of 0.002–0.100 inch.

* * * * *